US010949745B2

(12) United States Patent
Leobandung

(10) Patent No.: US 10,949,745 B2
(45) Date of Patent: *Mar. 16, 2021

(54) SMART LOGIC DEVICE

(71) Applicant: INTERNATIONAL BUSINESS MACHINES CORPORATION, Armonk, NY (US)

(72) Inventor: Effendi Leobandung, Stormville, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/524,773

(22) Filed: Jul. 29, 2019

(65) Prior Publication Data
US 2019/0354861 A1 Nov. 21, 2019

Related U.S. Application Data

(63) Continuation of application No. 15/189,620, filed on Jun. 22, 2016, now Pat. No. 10,452,973.

(51) Int. Cl.
G06N 3/08 (2006.01)
G06N 3/04 (2006.01)
G06F 12/02 (2006.01)
G06N 3/00 (2006.01)

(52) U.S. Cl.
CPC .......... *G06N 3/08* (2013.01); *G06F 12/0238* (2013.01); *G06F 12/0246* (2013.01); *G06N 3/004* (2013.01); *G06N 3/04* (2013.01); *G06F 2212/1032* (2013.01); *G06F 2212/202* (2013.01); *G06F 2212/7201* (2013.01)

(58) Field of Classification Search
CPC ........ G06N 3/08; G06N 3/04; G06F 12/0246; G06F 12/0238; G06F 2212/7201; G06F 2212/1032; G06F 2212/202
USPC ......................................................... 706/19
See application file for complete search history.

(56) References Cited

U.S. PATENT DOCUMENTS

| 5,247,206 A * | 9/1993 | Castro .................... G06N 3/063 706/35 |
| 5,612,531 A | 3/1997 | Barkan |
| 6,397,201 B1 | 5/2002 | Arathorn |
| 6,985,372 B1 | 1/2006 | Blyth et al. |
| 7,489,557 B2 | 2/2009 | Kim et al. |
| 8,204,927 B1 | 6/2012 | Duong et al. |
| 8,576,633 B2 | 11/2013 | Prabhakar et al. |
| 8,688,955 B2 | 4/2014 | Grunzke |
| 9,147,164 B2 | 9/2015 | Chester et al. |
| 2014/0380108 A1 | 12/2014 | Goldman et al. |
| 2016/0110644 A1 | 4/2016 | Huang et al. |

(Continued)

OTHER PUBLICATIONS

List of IBM Patents or Patent Applications Treated as Related dated Jul. 29, 2019, 2 pages.

*Primary Examiner* — Fernando Hidalgo
(74) *Attorney, Agent, or Firm* — Tutunjian & Bitetto, P.C.; L. Jeffrey Kelly

(57) ABSTRACT

A cognitive learning device includes inputs with each including an input path having a transistor device having a storage capacity. A circuit is responsive to the inputs and selects an input set in accordance with a current task, wherein the input set selected modifies a characteristic of the transistor device of one or more corresponding input paths to bias the input set for selection for subsequent accesses.

20 Claims, 4 Drawing Sheets

(56) References Cited

U.S. PATENT DOCUMENTS

2017/0078186 A1* 3/2017 Thyni .................. H04L 45/124
2020/0110999 A1   4/2020 Nugent et al.

* cited by examiner

SMART LOGIC DEVICE

BACKGROUND

Technical Field

The present invention generally relates to cognitive computing, and more particularly to devices and methods for computer learning using floating gate transistors.

Description of the Related Art

Neural networks (NN) are a leading method for implementing machine learning and training for cognitive computing. Cognitive computing provides a capability for computers to learn. Cognitive computing is the simulation of human thought processes in a computerized model. Cognitive computing involves self-learning systems that may employ data mining, pattern recognition and natural language processing to mimic the way the human brain works.

SUMMARY

In accordance with an embodiment of the present principles, a cognitive learning device includes inputs with each including an input path having a transistor device having a storage capacity. A circuit is responsive to the inputs and selects an input set in accordance with a current task, wherein the input set selected modifies a characteristic of the transistor device of one or more corresponding input paths to bias the input set for selection for subsequent accesses.

Another cognitive learning device includes a plurality of inputs, each input including an input path. At least one transistor device is associated with each input path, and the at least one transistor device has a storage capacity such that a threshold voltage of the at least one transistor device is modified in accordance with access criteria. A comparator circuit is responsive to the plurality of inputs and selects an input set in accordance with a current task such that the input set selected modifies the threshold voltage of the at least one transistor device to bias input paths associated with the input set for selection for subsequent accesses.

A method for employing a cognitive learning device includes randomly selecting a path initially among a plurality of input paths, each having at least one transistor; determining a correct input path for performing a current task; and modifying a threshold voltage of the at least one transistor associated with the correct path to bias selection of the correct path in subsequent accesses.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The disclosure will provide details in the following description of preferred embodiments with reference to the following figures wherein.

DETAILED DESCRIPTION

Figure 1:
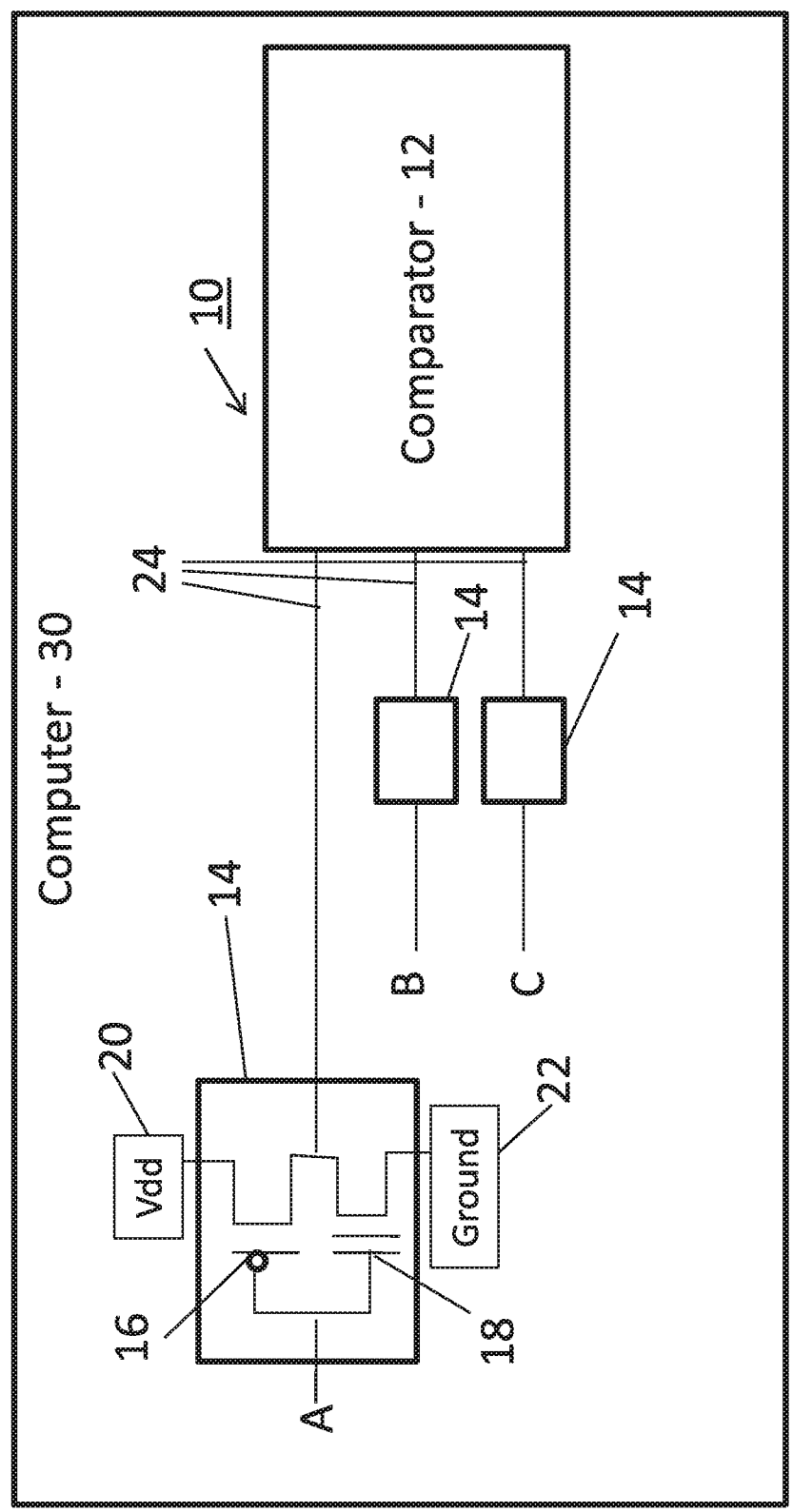
FIG. 1 is a schematic diagram showing a comparator circuit with three inputs in accordance with one illustrative embodiment in accordance with the present principles.

In accordance with the present principles, smart logic devices are provided that learn a priority path or process sequence to be employed based on previous actions or activity. Cognitive computing is employed to learn a best or most relevant algorithm, procedure, path or activity based upon set criteria. In one example, a floating gate field effect transistor (FET) or transistors are employed to change device characteristics based upon previous circuit activity. For example, a computer may be employed to identify an object type, such as cars, people, animals, etc. from images. In this example, an algorithm A is employed to identify cars, algorithm B is employed to identify people and algorithm C is employed to identify animals in images. If a number of cars seen by the computer is more frequent over a given time, the computer will be smart and check for cars first, rather than follow a same sequence for checking all three in a specific order. Using frequency or other criteria, a way to efficiently inform the computer as to which algorithm to perform first based on how often the algorithm has been used for a given time can be achieved. An analog non-volatile random access memory (NVRAM) device or devices may be employed for these purposes.

Floating gate storage devices provide programmable weighting devices and remain consistent with complementary metal oxide semiconductor (CMOS) processing. In one embodiment, floating gate metal oxide semiconductor (MOS) devices are employed as weighting devices in a cognitive computing application.

It is to be understood that the present invention will be described in terms of a given illustrative architecture; however, other architectures, structures, substrate materials and process features and steps may be varied within the scope of the present invention.

It will also be understood that when an element such as a layer, region or substrate is referred to as being "on" or "over" another element, it can be directly on the other element or intervening elements may also be present. In contrast, when an element is referred to as being "directly on" or "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The present embodiments may include a design for an integrated circuit chip, which may be created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer may transmit the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

Methods as described herein may be used in the fabrication of integrated circuit chips. The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

It should also be understood that material compounds will be described in terms of listed elements, e.g., SiGe. These compounds include different proportions of the elements within the compound, e.g., SiGe includes $Si_xGe_{1-x}$ where x is less than or equal to 1, etc. In addition, other elements may be included in the compound and still function in accordance with the present principles. The compounds with additional elements will be referred to herein as alloys.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Spatially relative terms, such as "beneath," "below," "lower," "above," "upper," and the like, may be used herein for ease of description to describe one element's or feature's relationship to another element(s) or feature(s) as illustrated in the FIGS. It will be understood that the spatially relative terms are intended to encompass different orientations of the device in use or operation in addition to the orientation depicted in the FIGS. For example, if the device in the FIGS. is turned over, elements described as "below" or "beneath" other elements or features would then be oriented "above" the other elements or features. Thus, the term "below" can encompass both an orientation of above and below. The device may be otherwise oriented (rotated 90 degrees or at other orientations), and the spatially relative descriptors used herein may be interpreted accordingly. In addition, it will also be understood that when a layer is referred to as being "between" two layers, it can be the only layer between the two layers, or one or more intervening layers may also be present.

It will be understood that, although the terms first, second, etc. may be used herein to describe various elements, these elements should not be limited by these terms. These terms are only used to distinguish one element from another element. Thus, a first element discussed below could be termed a second element without departing from the scope of the present concept.

Referring now to the drawings in which like numerals represent the same or similar elements and initially to FIG. 1, an illustrative cognitive computing circuit 10 includes a circuit responsive to one or more inputs 24, such as a comparator device 12 capable of measuring differences in voltage (or current) between input terminals 24. It should be understood that while a comparator device is illustratively shown in accordance with one embodiment, other embodiments may include other circuit types and configurations. In some examples, comparators 12 may include a sensor circuit, a switching device or devices, logic gates, etc. In other embodiments, part or all of the circuit 10 may include software elements or be part of a computer.

Initially devices in gate circuits 14, e.g., transistors 16, 18, on paths A, B and C will have about a same threshold voltage ($V_T$). Transistors 16, 18 may include NVRAM devices, such as, e.g., floating gate transistors or other devices that include storage features so that an accumulated history of usage can be tracked or employed.

In one illustrative embodiment, the gate circuits 14 may include a plurality of transistor devices (e.g., NVRAM transistors). The transistors of the gate circuits 14 may include a p-type field effect transistor (PFET) 16 and an n-type field effect transistor (NFET) 18. Depending on an input pulse to the gate device 14, either Vdd 20 or Ground 22 is provided on the input line to the comparator 12.

Comparator 12 may randomly pick a path A, B or C. In one example, path B is assumed to be picked randomly, initially, and the circuit 10 executes path B, path A, and then path C. However, upon execution of all paths, it is determined that the correct path was path C. NVRAMs in path C are selected and charge is stored in the NVRAM of path C. This can have the effect of modifying the $V_T$. In one embodiment, the $V_T$ is increased with the selection or determination of path C.

In a next round, threshold voltages ($V_T$) of path C will be higher and will be selected (instead of randomly) by comparator 12 more easily than the other paths (A, B). If path C is the correct path in the next round (of accessing comparator circuit 10), then the path C NVRAMs 16, 18 are selected again and $V_T$ is increased further. If C is continually the correct path, the path C NVRAMs $V_T$ will be higher than the rest and will continue to be a starting point for the processing. If the pattern shifts to B or A, the path NVRAMs will be selected and $V_T$ will be increased for the selected path(s).

In one embodiment, the selection of a new path may cause the threshold voltage to decrease in the other paths by permitting some discharging of the storage in the path NVRAMs. In some embodiments, a discharge or reset function may be provided to re-initiate the path NVRAMs.

The device 10 may be one of a plurality of devices 10 employed in a computer device 30 or as part of a computer system. The computer device or system 30 preferably includes hardware for carrying out operations and in particular includes integrated circuits. In other embodiments, combinations of hardware and software may be employed.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
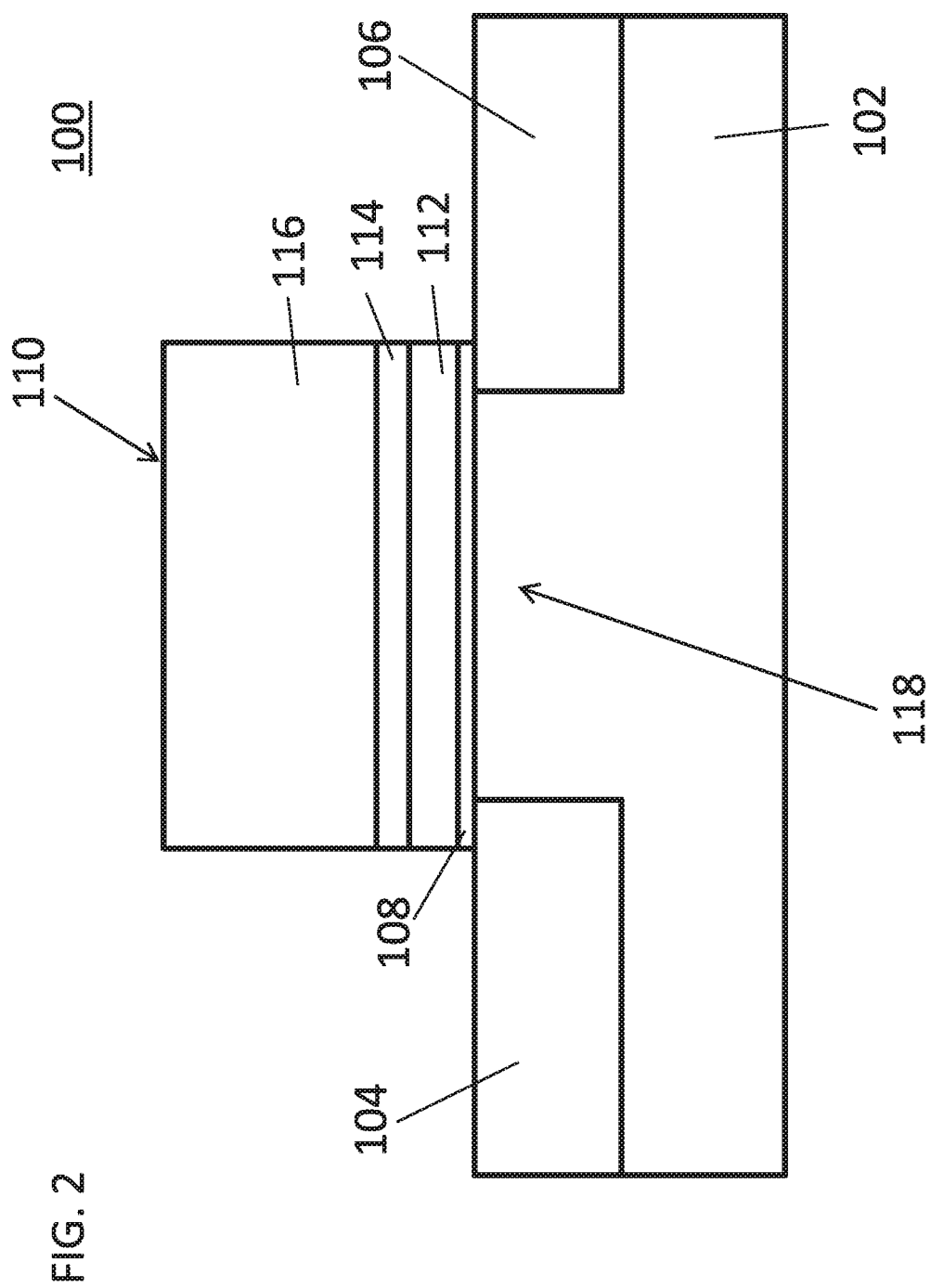
FIG. 2 is a cross-sectional view illustratively showing a floating gate transistor device in accordance with one embodiment of the present principles.

Referring to FIG. 2, a floating gate transistor device 100 is illustratively shown with a planar device structure. However, the floating gate transistor device 100 may be a vertical transistor, a finFET or any other transistor structure. The floating gate transistor device 100 may be an analog device although digital devices may also be employed. The device 100 includes a substrate 102. The substrate 102 may be crystalline (e.g., monocrystalline). The substrate 102 may be essentially (i.e., except for contaminants) a single element (e.g., silicon), primarily a single element (i.e., with doping), for example, silicon (Si) or germanium (Ge), or the substrate may be a compound semiconductor, for example, a III-V compound semiconductor (e.g., GaAs), SiC, or SiGe.

The substrate 102 may also have multiple material layers, for example, a semiconductor-on-insulator substrate (SeOI), a silicon-on-insulator substrate (SOI), germanium-on-insulator substrate (GeOI), or silicon-germanium-on-insulator substrate (SGOI). In one or more embodiments, the substrate 102 may be a silicon wafer. In various embodiments, the substrate is a single crystal silicon wafer. A single crystal silicon substrate may have a <100> or a <111> surface. In the embodiment shown, the substrate 102 includes a bulk substrate.

The substrate 102 may be doped to form source regions 104 and drain regions 106 in the bulk material of the substrate 102. The source region 104 and drain region 106 may be doped by implantation, diffusion or epitaxially grown on the substrate and doped in-situ (during its fabrication). The source/drain regions 104/106 may be n-doped or p-doped. The source/drain regions 104/106 may have a dopant concentration in the range of about $1 \times 10^{19}$ to about $1 \times 10^{22}$ dopant atoms/cm$^3$. In various embodiments, the source/drain regions 104/106 include a same or different material than the substrate 102. It should be noted that the positions of the source and a drain may be interchanged.

A channel region 118 is disposed between the source/drain regions 104/106 and below a floating gate structure 110. The channel region 118 may be doped and may include one or more other dopant regions, e.g., halo dopant regions, etc. The gate structure 110 includes a lower gate dielectric 108. The lower gate dielectric 108 may be grown or deposited by, e.g., atomic layer deposition (ALD) and/or chemical vapor deposition (CVD). The lower gate dielectric 108 may be silicon oxide, silicon nitride, silicon oxynitride, and/or a high-k material, including but not limited to metal oxides such as hafnium oxide (e.g., $HfO_2$), hafnium silicon oxide (e.g., $HfSiO_4$), hafnium silicon oxynitride ($Hf_wSi_xO_yN_z$), lanthanum oxide (e.g., $La_2O_3$), lanthanum aluminum oxide (e.g., $LaAlO_3$), zirconium oxide (e.g., $ZrO_2$), zirconium silicon oxide (e.g., $ZrSiO_4$), zirconium silicon oxynitride ($Zr_wSi_xO_yN_z$), tantalum oxide (e.g., $TaO_2$, $Ta_2O_5$), titanium oxide (e.g., $TiO_2$), barium strontium titanium oxide (e.g., $BaTiO_3$—$SrTiO_3$), barium titanium oxide (e.g., $BaTiO_3$), strontium titanium oxide (e.g., $SrTiO_3$), yttrium oxide (e.g., $Y_2O_3$), aluminum oxide (e.g., $Al_2O_3$), lead scandium tantalum oxide ($Pb(Sc_xTa_{1-x})O_3$), and lead zinc niobate (e.g., $PbZn_{1/3}Nb_{2/3}O_3$). The high-k dielectric material may further include dopants such as lanthanum and/or aluminum. The stoichiometry of the high-k dielectric material may vary. In various embodiments, the lower gate dielectric 108 may have a thickness in the range of about 5 nm to about 9 nm.

A floating gate or node 112 includes a conductive material such as polysilicon or doped polysilicon. The floating gate 112 may include a thickness of between about 1 to about 10 nm. An upper dielectric 114 is formed on the floating gate 112. The upper dielectric 114 may include the same or different materials as the lower dielectric 108. The upper dielectric 114 may include a thickness of between about 8 to about 12 nm.

In one or more embodiments, a gate conductor 116 may be deposited over the upper dielectric 114. The gate conductor 116 may include a work function layer (not shown) that may be conformally deposited by ALD and/or CVD. The work function layer may be a nitride, including but not limited to titanium nitride (TiN), hafnium nitride (HfN), hafnium silicon nitride (HfSiN), tantalum nitride (TaN), tantalum silicon nitride (TaSiN), tungsten nitride (WN), molybdenum nitride (MoN), niobium nitride (NbN); a carbide, including but not limited to titanium carbide (TiC), tantalum carbide (TaC), hafnium carbide (HfC), and combinations thereof. The work function layer may have a thickness in the range of about 1 nm to about 11 nm, or may have a thickness in the range of about 2 nm to about 5 nm.

In one or more embodiments, the gate conductor 116 may further include a thin a gate metal layer (not shown) which may be formed on the work function layer, where the gate metal layer may include a thin layer conformally deposited on the work function layer. The gate conductor 116 is deposited and patterned to form a gate electrode that may include tungsten (W), aluminum (Al), titanium nitride (TiN), cobalt (Co), etc. or combinations thereof. In various embodiments, the gate dielectric layer 108, the floating gate 112, the upper dielectric 114 and the gate conductor 116 (and layers thereof) may be etched/patterned in a same or multiple etch processes, e.g., reactive ion etching (RIE).

The floating gate 112 is electrically isolated to create a floating node (112). The floating node 112 may be charged using the gate conductor 116, which is deposited above the floating gate 112 and electrically isolated from the floating gate 112. The gate conductor (or conductors) is capacitively coupled to the floating gate 112. Since the floating gate 112 is completely surrounded by highly resistive material, the charge stored in the floating gate 112 remains unchanged for a period of time. Fowler-Nordheim tunneling, hot-carrier injection mechanisms, induction, etc. may be employed as mechanisms to modify the amount of charge stored in the floating gate 112.

The amount of charge of the floating gate 112 is employed to adjust a threshold voltage in accordance with an amount of stored charge. The present principles provide a floating gate structure 100 that is completely compatible with standard CMOS processing. The floating gate structure 100 may be employed in hardware neural networks that can be formed on a chip alone or integrated with other structures and devices. The gate structure 110 may further include spacers, a gate cap and other structures depending on the device type and design.

In one illustrative embodiment, Vdd may equal 1V and the lower dielectric 108 can store 2 microF/cm² with leakage of about $1\times10^{-3}$ A/cm². Charge stored at full 1V equals about $2\times10^{-6}$ C/cm². Each access of the device 100 may be assumed to be about 1 ns and hot electrons can provide 0.1 A/cm² current so that a charge of $1\times10^{-10}$ C. can be achieved. In this case, it will take 20,000 cycles to fill in the capacitor (floating gate 112). In such a case, 20,000 cycles would be needed to achieve a maximum threshold voltage. The lower dielectric 108, the floating gate 112, Vdd, etc. may be modified to permit different numbers of cycles so that that the threshold voltage may be more or less finely tuned.

In other embodiments, the floating gate or node 112 can be completely charged and discharged after every cycle to lower threshold voltage. For example, ~1 ms may be needed for a complete discharge (to empty the charge). This employs, e.g., 1 million cycles of 1 ns each to completely discharge the device 100. Other configurations are also contemplated.

In accordance with the present principles, the floating gate transistor devices 102 can be programmed and reprogrammed with charge storage values to provide a smart logic device. The floating gate transistor devices 102 may be provided in a memory array, processor or any other suitable device. Each floating gate transistor device 102 can be adjusted to, e.g., to have a threshold voltage bias (preferential path or paths (a set of paths). Each floating gate transistor device 102 can be individually programmed during a pulse sequence or sequences and can be reprogrammed during a reset sequence to further update the threshold voltages.

Figure 3:
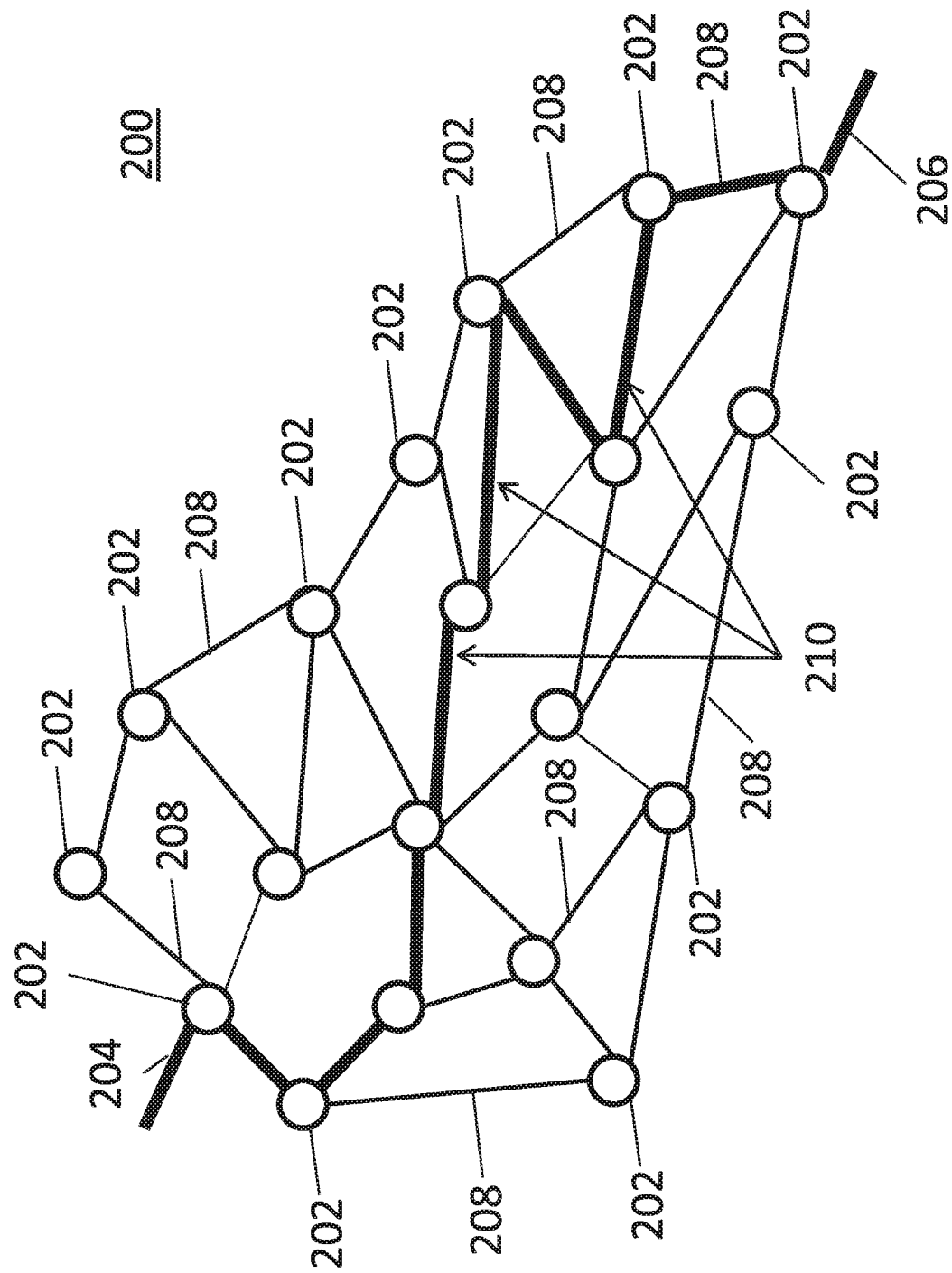
FIG. 3 is a network diagram showing a network of cognitive learning devices linked together and an illustratively selected path in accordance with the present principles.

Referring to FIG. 3, an illustrative node network for cognitive learning 200 is provided in accordance with one illustrative embodiment. The network 200 includes a plurality of nodes 202, which are connected by links 208. Each node 202 may include smart logic devices, e.g., cognitive learning device 10 (FIG. 1) for biasing a path within the network 200. For example, if a given path 210 through the network is selected multiple times, the path will be biased for the next selection by altering the threshold voltages of the active devices (transistors) in the path 210. The path 210 between input 204 and output 206 can change with the selection of different nodes 202. The nodes 202 may also include other circuitry to perform a process step, a sequence, run an algorithm, etc.

Using the above example, network 200 may be employed for image processing to identify a pattern or object in an image. Each node 202 may represent an image processing step. To find an image of a car, a path 210 is found to provide the needed processing steps or algorithms. After successive progressions of executing the network or network paths, object recognition of cars is employed a greater number of times than other object types. This biases the path 210 so that a next time the network is employed, the initial process sequence defaults to path 210 to reduce access and execution time based on a probability that the next object to be identified will be a car. Each node 202 can be selected based on any suitable criteria including but not limited to frequency of access, lack of access, user selection, duration of access, etc.

Figure 4:
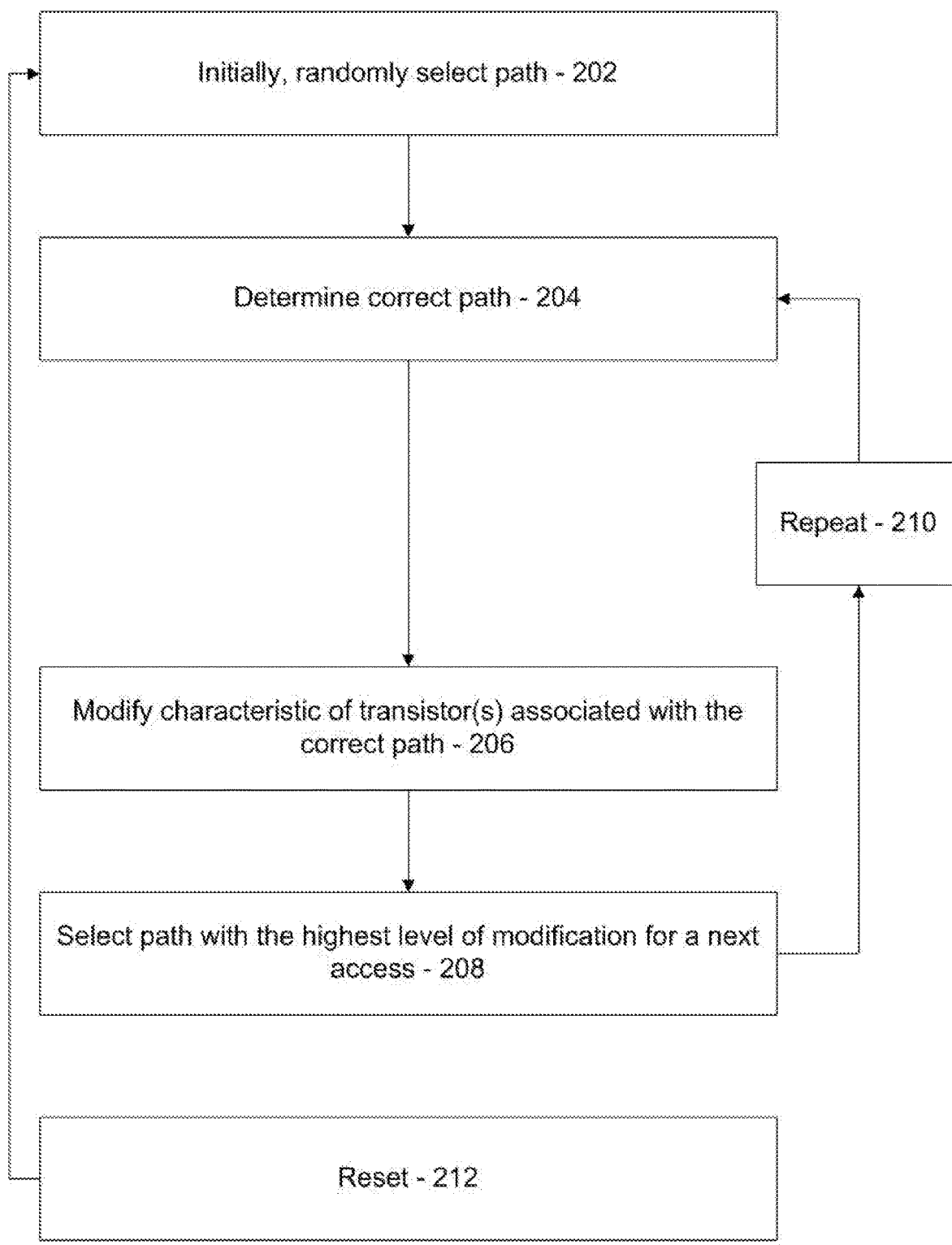
FIG. 4 is a block/flow diagram showing a method for employing a cognitive learning device in accordance with the present principles.

Referring to FIG. 4, a method for employing a cognitive learning device is illustratively shown in accordance with an exemplary embodiment. In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In block 202, a path is initially selected randomly among a plurality of input paths. Each input path has at least one transistor. The transistor includes a storage capability so that accesses or usage frequency (or other characteristics) can be counted or monitored. In block 204, a correct input path is determined for performing a current task. This determination may be made after the computation runs, and it is determined that the randomly selected path was not correct. For example, if the cognitive learning device is run on a computer, the computer will eventually determine the correct path based on the computation run. In one example, for identifying an object in an image, the correct input path may be determined to be correct only after an incorrect path or paths are run and results are obtained by running a path or algorithm for the wrong object type.

In block 206, a threshold voltage of the at least one transistor associated with the correct path is modified to bias selection of the correct path in subsequent accesses. This occurs after the correct path is selected for a given task. The path selection activates the path and the threshold voltage is modified by each access. The more the accessing, the greater the change to the threshold voltage and the greater bias for that path or set of paths.

The at least one transistor device may include a non-volatile random access memory having a floating gate as storage capacity. The threshold voltage is modified by charging or discharging per access to alter characteristics of the at least one transistor device. The at least one transistor device is charged or discharged initially to reset the input paths. The at least one transistor device may include other methods for modifying its characteristics. For example, a channel resistance or other characteristic may be modified.

In block 208, a path is selected with the highest level of modification for a next access. In block 210, blocks 204, 206 and 208 are repeated until a reset is needed. In block 212, a reset may be performed: after a duration has elapsed, randomly or after one or more of the transistor devices has achieved a maximum or minimum charge storage. If a reset is needed, the transistor storage is fully discharged or charged and processing returns to block 202.

In some embodiments, device biasing may be performed manually by identifying preferential devices or paths and inputting a bias charge of amount. In this way, the charge may be programmed manually by allotting a charge or discharge to bias the path or paths.

Having described preferred embodiments for smart logic devices (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A cognitive learning device, comprising:
a plurality of inputs, each input including an input path having at least one transistor device having a storage capacity; and
a circuit responsive to the plurality of inputs and selecting an input set in accordance with a current task;
wherein at least one voltage threshold of the at least one transistor device of the input set is adjusted by changing an amount of stored charge to bias a selected path of a plurality of paths for subsequent processing.

2. The device, as recited in claim 1, wherein the threshold voltage of the at least one transistor device of at least one path that is not selected is decreased.

3. The device, as recited in claim 1, wherein the at least one transistor device includes a non-volatile random access memory having a floating gate as the storage capacity.

4. The device, as recited in claim 3, wherein the floating gate is charged or discharged per access to alter a threshold voltage of the at least one transistor device.

5. The device, as recited in claim 1, wherein the circuit includes a comparator.

6. The device, as recited in claim 5, wherein the comparator randomly selects one of the input paths to determine a correct path and modifies the voltage threshold of the at least one transistor device corresponding to the correct path.

7. The device, as recited in claim 1, wherein the at least one transistor device is charged or discharged initially to reset the device.

8. The device, as recited in claim 1, wherein the input set includes at least one input path.

9. The device, as recited in claim 1, wherein the at least one transistor device includes an analog device.

10. A cognitive learning device, comprising:
a plurality of inputs, each input including an input path;
at least one transistor device associated with each input path, the at least one transistor device having a storage capacity such that a threshold voltage of the at least one transistor device is modified in accordance with access criteria; and
a comparator circuit being responsive to the plurality of inputs and selecting an input set in accordance with a current task such that at least one voltage threshold of the at least one transistor device of the input set is adjusted by changing an amount of stored charge to bias a selected path of a plurality of paths for subsequent processing.

11. The device, as recited in claim 10, wherein the threshold voltage of the at least one transistor device of at least one path that is not selected is decreased.

12. The device, as recited in claim 10, wherein the at least one transistor device includes a non-volatile random access memory having a floating gate as the storage capacity.

13. The device, as recited in claim 12, wherein the floating gate is charged or discharged per access to alter the threshold voltage of the at least one transistor device.

14. The device, as recited in claim 10, wherein the comparator randomly selects one of the input paths to determine a correct path and modifies the threshold voltage of the at least one transistor device corresponding to the correct path.

15. The device, as recited in claim 10, wherein the at least one transistor device is charged or discharged initially to reset the device.

16. The device, as recited in claim 10, wherein the input set includes at least one input path.

17. The device, as recited in claim 10, wherein the at least one transistor device includes an analog device.

18. A method for employing a cognitive learning device, comprising:
randomly selecting a path initially among a plurality of input paths, each having at least one transistor;
determining a correct input path for performing a current task; and
changing at least one voltage threshold of the at least one transistor device by changing an amount of stored charge to bias a selected path of a plurality of paths for subsequent processing.

19. The method, as recited in claim 18, wherein the at least one transistor device includes a non-volatile random access memory having a floating gate as the storage capacity, the method further comprises charging or discharging per access to modify the threshold voltage of the at least one transistor device.

20. The method, as recited in claim 18, wherein the at least one transistor device is charged or discharged initially to reset the input paths.

* * * * *